United States Patent
Charara et al.

(10) Patent No.: US 8,607,628 B2
(45) Date of Patent: Dec. 17, 2013

(54) METHOD FOR A FORMATION PROPERTIES DETERMINATION

(75) Inventors: Marwan Charara, Moscow (RU); Anton Vladimirovich Parshin, Moscow (RU); Evgeny Nikolaevich Dyshlyuk, Moscow (RU); Oleg Mikhailovich Zozulya, Moscow (RU); Sergey Sergeevich Safonov, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 354 days.

(21) Appl. No.: 12/981,081

(22) Filed: Dec. 29, 2010

(65) Prior Publication Data

US 2011/0154895 A1    Jun. 30, 2011

(30) Foreign Application Priority Data

Dec. 30, 2009   (RU) .................................. 2009149026

(51) Int. Cl.
*E21B 47/00*     (2012.01)
*G01V 1/50*      (2006.01)

(52) U.S. Cl.
CPC ........................................ *G01V 1/50* (2013.01)
USPC .................. 73/152.05; 73/152.01; 73/152.02; 73/152.12; 73/152.13; 73/152.16; 73/584; 73/645

(58) Field of Classification Search
USPC ............... 73/152.16, 152.05, 152.01, 152.02, 73/152.12, 152.13, 584, 645; 374/45
See application file for complete search history.

(56) References Cited

U.S. PATENT DOCUMENTS

| | | | |
|---|---|---|---|
| 3,807,227 A | 4/1974 | Smith, Jr. | |
| 3,864,969 A | 2/1975 | Smith, Jr. | |
| 3,892,128 A | 7/1975 | Smith, Jr. | |
| 4,343,181 A | 8/1982 | Poppendiek | |
| 4,575,260 A | 3/1986 | Young | |
| 4,644,283 A | 2/1987 | Vinegar et al. | |
| 4,813,028 A * | 3/1989 | Liu ................................. | 367/31 |
| 4,855,912 A | 8/1989 | Banavar et al. | |
| 5,852,587 A * | 12/1998 | Kostek et al. .................. | 367/25 |

(Continued)

FOREIGN PATENT DOCUMENTS

| | | |
|---|---|---|
| GB | 2071319 | 9/1981 |
| RU | 2132560 | 6/1999 |

(Continued)

OTHER PUBLICATIONS

"The Temperature Dependence of Seismic Waves in Ice", Heinz Kohnen, Journal of Glaciology, vol. 13, No. 67, 1974.*

(Continued)

*Primary Examiner* — Hezron E Williams
*Assistant Examiner* — Alexander Mercado

(57) ABSTRACT

A method for determining properties of a formation is described herein. The method includes disposing a well-logging tool in a borehole. The well-logging tool includes a device for varying temperature of the formation and two acoustic logging probes located symmetrically along the well-logging tool length relative to the device for varying temperature of the formation. During the logging tool movement in the borehole, continuous varying of the formation temperature, continuous acoustic logging, and continuous measurement of formation temperature are performed. Dependencies of the measured velocity and attenuation of the Stoneley waves as functions of the measured temperature of the formation are obtained. Based on the obtained dependencies, properties of the formation are determined.

6 Claims, 1 Drawing Sheet

(56) References Cited

U.S. PATENT DOCUMENTS

| | | | |
|---|---|---|---|
| 6,755,246 B2 * | 6/2004 | Chen et al. | 166/250.01 |
| 8,122,951 B2 | 2/2012 | Fukuhara et al. | |
| 2003/0192691 A1 * | 10/2003 | Vinegar et al. | 166/250.12 |

FOREIGN PATENT DOCUMENTS

| | | |
|---|---|---|
| RU | 2136880 | 9/1999 |
| RU | 2194855 | 12/2002 |
| RU | 2006106171 | 9/2007 |
| SU | 1125519 | 11/1984 |

OTHER PUBLICATIONS

Schlumberger Oilfield Glossary (http://www.glossary.oilfield.slb.com/Display.cfm?Term=Stoneley%20wave).*

Schlumberger Oilfield Glossary (http://www.glossary.oilfield.slb.com/Display.cfm?Term=monopole).*

* cited by examiner

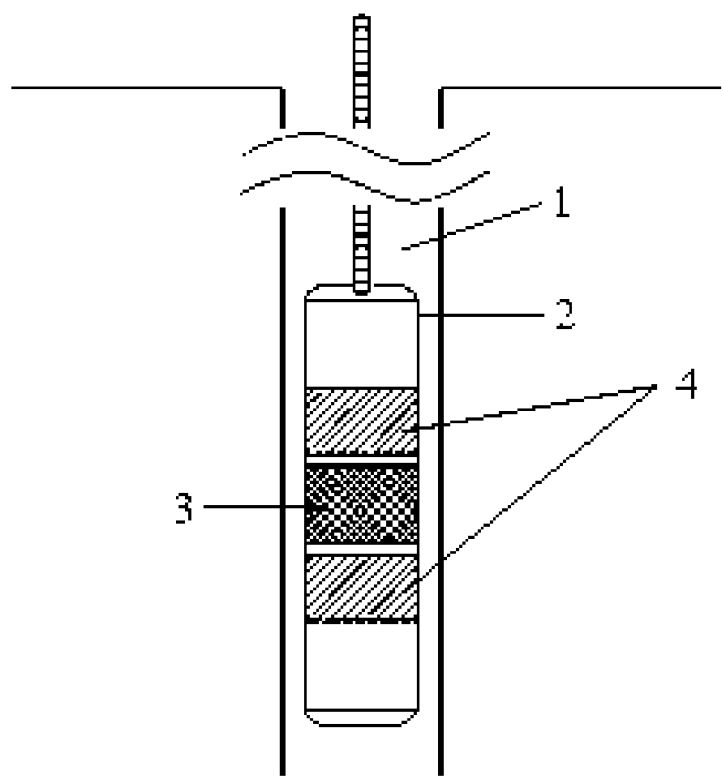

METHOD FOR A FORMATION PROPERTIES DETERMINATION

TECHNICAL FIELD OF THE DISCLOSURE

The invention is related to the geophysical well logging (GWL).

BACKGROUND OF THE DISCLOSURE

GWL methods consist in measuring a certain value characterizing one or more physical properties of rocks along a borehole in pressure-temperature conditions that are determined by the rock's depth and different geological and technological conditions.

Currently more than 50 GWL methods and their variations are known. A disadvantage of known methods is that the measurement of physical values of rocks at certain depths is performed at certain pressure-temperature conditions that remain unchanged during logging.

Determination of properties of rocks determination during by varying formation temperature is known from prior art methods. Thus, USSR Certificate of Authorship No. 1125519 describes a method for determining formation properties according to which a deposit is heated and a nuclear magnetic resonance (NMR) logging measurement or acoustic logging measurement is performed before the deposit is heated and after the deposit is heated. A free fluid index, a spin-lattice relaxation and a porosity are measured. Based on these values, an oil recovery factor is estimated. The heating is performed by injecting a heating agent or by means of fireflooding.

The closest prior art is a method for determining parameters of a formation as described in U.S. Pat. No. 6,755,246, wherein active or passive heating of the formation is performed to increase a temperature of fluids in the formation thus changing a relaxation time $T_2$ of NMR spin echo measurement which is used to identify and quantify heavy oil saturation. This method's disadvantage is that it is performed by "logging-exposure-logging" which significantly increases the GWL time.

Another disadvantage of the NMR logging method is that decay times are so short in some formations, for example, in tight sands, that signals cannot be measured. The main problem with relating NMR relaxation times to formation permeability is that pores probed by NMR are not necessarily hydraulically connected. Consequently, an impermeable medium containing disconnected vugs may yield the same $T_1$ decay curves as a permeable rock containing connected pores.

SUMMARY OF THE DISCLOSURE

The disclosure provides for improved data collection using GWL methods and enhanced technological and functional features of the GWL equipment.

The method comprises disposing a well-logging tool in a borehole within a formation. The well-logging tool comprises a device for varying temperature of the formation and at least two identical acoustic logging probes located symmetrically along the well-logging tool length relative to the device for varying the formation temperature. The method also includes moving the well logging tool in the borehole and performing continuous acoustic logging while simultaneously and continuously varying formation temperature. The method further includes measuring formation temperature, velocity and attenuation of Stoneley waves generated by the acoustic logging probes. If necessary, at least one repeated logging of the borehole may be performed. Properties of the formation are determined based on the parameters measured as function of the formation temperature.

The varying the formation temperature is performed by means of heating or cooling of the formation. Heating may be performed by means of a downhole heater. Properties of the formation that can be determined include formation relative permeability, fluid viscosity within the formation and/or viscous flow activation energy within the formation. The well-logging tool may comprise at least one additional device for varying the formation temperature and at least one additional logging probe mounted alternately and located in such a way that each additional device for varying the formation temperature is located between two identical logging probes.

BRIEF DESCRIPTION OF THE FIGURES

FIG. 1 shows an example of a well-logging tool with two acoustic logging probes.

DETAILED DESCRIPTION

The method for determining properties of a formation is implemented as follows.

A well-logging tool 2 includes one or more devices 3 for varying temperature of the formation as well as two or more identical logging probes 4 located symmetrically along the tool 2 length relative to the device 3 for varying temperature of the formation. The tool is delivered into a borehole 1 using any known method. Logging is performed using the well-logging tool 2. The logging is performed continuously during the tool's upward movement in the borehole. Simultaneously, during the movement, the temperature of the formation is altered and the temperature of the formation is measured.

Afterwards, at least one repeated logging is performed and during each run up and down the borehole the formation temperature is measured. Curves of the measured parameters are plotted versus temperature. Obtained dependencies of the measured parameters on temperature are then used to obtain information about the formation properties. For example, in the case of acoustic logging, dependence of velocity and attenuation of the acoustic waves generated by the logging tool can be used for evaluation of the formation properties.

The formation properties that can be determined may include relative permeability of the formation, fluid viscosity within the formation, viscous flow activation energy within the formation.

As an example, an acoustic log based on the measurement of the temperature dependencies of the dispersion curves for Stoneley wave is shown. The example is based on the fact that in permeable formations amplitudes of Stoneley waves undergo frequency-dependent attenuation resulting from fluid flow. The degree of non-elastic attenuation is proportional to formation fluid mobility. Analysis of Stoneley waves generated at different temperature conditions is an indicator of permeability of a permeable formation as well as an indicator of viscosity of a fluid within the formation.

A well-logging tool includes a device for varying the temperature of an area of the formation (the device also provides measurement of the formation area temperature) as well as two or more identical acoustic logging probes located symmetrically relative to the device for varying the temperature. The tool is delivered into a borehole using any known method. The logging is performed continuously during the tool's upward movement in the borehole, simultaneously the temperature of the formation is altered. The temperature variation may be performed by heating or cooling the formation. The formation may be heated using a local downhole heater. The local downhole heater heats the formation thus changing the temperature of the formation. The velocity and attenuation of Stoneley waves are measured. Symmetrical positioning of the acoustic logging probes relative to the local downhole heater enables measuring velocity and attenuation of Stoneley waves before, during, and after heating of the area in question. Let us consider a solid porous formation in which a borehole is drilled. The porous space and the borehole are filled with a viscous two-phase fluid. Velocity and attenuation of Stoneley waves may be some of the parameters determined using acoustic logging methods.

Velocity $V_t$ of Stoneley in this borehole is determined by the equation:

$$V_t^{-2} = \rho_f \left[ \frac{1}{K_f} + \frac{1}{G} - \frac{2}{ia\omega} \frac{k_0}{\eta_f} E(a\sqrt{-i\omega/D}) \right], \quad (1)$$

where $\omega$ is a cyclic frequency; $\rho_f$, $\eta_f$, $K_f$ are density, viscosity, and elastic bulk modulus of the fluid within the pores of the formation, respectively; K, G, $k_0$ are bulk modulus of elasticity, shear modulus, and absolute permeability of the formation, respectively; $\phi$ is porosity of the formation; a is the radius of the borehole; $E(x)=x\, K_1(x)/K_2(x)$, here $K_{0,1}(x)$ are Kelvin functions; and D is the diffusion coefficient for the Biot wave of the second kind:

$$D = \frac{k_0}{\eta_f} \frac{K_f}{\phi} (1+\xi)^{-1} \quad (2)$$
$$\approx \frac{k_0}{\eta_f} \frac{K_f}{\phi}$$
$$= \frac{K_f}{\phi} k_0 \left( \frac{k_1}{\eta_1} + \frac{k_2}{\eta_2} \right),$$

correction $\xi$ for rigid formations may be neglected (K+(4/3)G>>$K_f$). Here viscosities $\eta_{1,2}$ and relative phase permeabilities $k_{1,2}$ for liquid phases filling the porous space were introduced.

Velocity of Stoneley wave determined by the equation (1), is a complex value. To obtain phase velocity $c_t$ and attenuation rate $\alpha$, it is necessary to segregate real and imaginary part of this equation:

$$c_t^{-1} = \text{Re}(V_t^{-1}), \alpha = \omega \text{Im}(V_t^{-1}).$$

Measuring frequency dependence of the Stoneley wave phase velocity $c_t(\omega)$ or attenuation $\alpha(\omega)$ for different temperatures and using a non-linear simplex approximation method for the model (1) it is possible to determine the temperature dependence for diffusion coefficient D(T). The only temperature-dependent values included in the equation (2) determining diffusion coefficient D are viscosities of the liquid phases filling the porous medium. Liquid phase vs. temperature dependence can be approximated using Arrhenius' law with a good accuracy:

$$\eta_{1,2} = \eta_{1,2}^0 \exp(W_{1,2}/RT), \quad (3)$$

where $W_{1,2}$ are viscous flow activation energy values, T is absolute temperature, and R is the universal gas constant. If the activation energy values $W_{1,2}$ are different, the contributions of the fluids into the diffusion coefficient will change as the temperature changes. With the known porosity $\phi$ and absolute permeability $k_0$ values, one can use the system of two linear equations in the form of (2), written for two different formation temperatures to determine unknown values of the relative phase permeability $k_{1,2}$.

The solution to this system is as follows:

$$\begin{bmatrix} k_1 \\ k_2 \end{bmatrix} = \frac{\phi}{k_0 K_f \Delta} \begin{bmatrix} (\eta_1^e/\eta_2^e)(\eta_2^b D^b - \eta_2^e D^e) \\ (\eta_2^b/\eta_1^b)(\eta_1^e D^e - \eta_1^b D^b) \end{bmatrix},$$

Where superscripts 'b' and 'e' denote initial and final temperature respectively, the system determinant is equal to:

$$\Delta = \frac{\eta_2^b}{\eta_1^b} \frac{\eta_1^e}{\eta_2^e} - 1 = \exp\left( \frac{\Delta W}{R} \left( \frac{1}{T^b} - \frac{1}{T^e} \right) \right) - 1 \approx \exp\left( \frac{\Delta W}{RT^2} \Delta T \right) - 1.$$

This system of equations will be conditioned better (and, consequently, the experimental data processing error will be smaller), if a difference between the activation energy values $\Delta W = W_2 - W_1$ is higher, namely when the following condition is met:

$$\ln(\Delta - 1) \approx \frac{\Delta W}{RT^2} \Delta T \ge 1. \quad (4)$$

When the fluid within the pores of the formation is a mixture of water and oil, let us determine a value by which the activation energy for oil must be higher than the activation energy for water in case where the pore fluid is heated by 30° C. If the formation temperature is 330 K, we obtain the value of $\Delta W=30$ kJ/mol. The activation energy for water is equal to $W_1=19.3$ kJ/mol, consequently, the methodology offered will work well for oil fields where the activation energy value is comparable with 50 kJ/mol—as a rule, this is typical for viscous or heavy oil fields.

According to the method herein, velocity and attenuation of acoustic waves generated by the logging probes are measured relative to the relevant temperature variation due to a local downhole heating operation. In one of the embodiments of the invention, one or more heaters are located between two or more identical acoustic logging probes and measurements are performed at least twice—using one probe before heating and the other one during heating. Then measured parameters corresponding to different temperatures of the area of the formation between different pairs of the logging acoustic probes are analyzed. As a result, relative phase permeability, fluid viscosity within the formation and viscous flow activation energy within the formation may be determined by dependencies of velocity and attenuation of acoustic waves as function of temperature and by the dependencies of fluid viscosity within the formation as function of temperature.

What is claimed is:
1. A method for determining a property of a formation, the method comprising:
  disposing a well-logging tool in a borehole within the formation, the tool comprising a device for varying temperature of the formation and at least two acoustic logging probes located symmetrically along the tool length relative to the device for varying temperature of the formation,
  moving the well logging tool in the borehole and performing continuous acoustic logging while simultaneously and continuously varying the temperature of the forma- tion and measuring (i) temperature of the formation and (ii) velocity and attenuation of Stoneley waves generated by the acoustic logging probes, obtaining the measured velocity and the measured attenuation of the Stoneley waves as functions of the measured temperature of the formation, and determining from the functions at least one property selected from the group consisting of: relative phase permeability of the formation, fluid viscosity within the formation, and viscous flow activation energy within the formation.

2. The method of claim 1 wherein varying temperature of the formation is performed by heating the formation.

3. The method of claim 1 wherein varying temperature of the formation is performed by cooling of the formation.

4. The method of claim 2 wherein heating is performed using a downhole heater.

5. The method of claim 1 wherein at least one additional logging measurement is performed.

6. The method of claim 1 wherein the well-logging tool comprises at least one additional device for varying temperature of the formation mounted and positioned so that each additional device for varying temperature of the formation is disposed between the acoustic logging probes.

\* \* \* \* \*